United States Patent [19]

Eloy et al.

[11] Patent Number: 5,305,140
[45] Date of Patent: Apr. 19, 1994

[54] DOOR VIEWING APPARATUS

[76] Inventors: Luis A. Eloy; Andrea Eloy, both of 7419 2nd Ave. 2nd Flr., North Bergen, N.J. 07047

[21] Appl. No.: 980,350

[22] Filed: Nov. 23, 1992

[51] Int. Cl.⁵ .............................................. G02B 23/08
[52] U.S. Cl. ..................................... 359/402; 359/406
[58] Field of Search ................ 359/402, 403, 405, 406

[56] References Cited

U.S. PATENT DOCUMENTS 3,204,523  9/1965  Daily ..................................... 359/405
4,921,339  5/1990  Brischke .............................. 359/406

Primary Examiner—Scott J. Sugarman
Attorney, Agent, or Firm—Leon Gilden

[57] ABSTRACT

A periscope structure is mounted to a door assembly to accommodate individuals restricted relative to standing, wherein the periscope structure is vertically adjustable and is arranged for ease of mounting to the associated door structure employing a mounting housing organization.

4 Claims, 4 Drawing Sheets

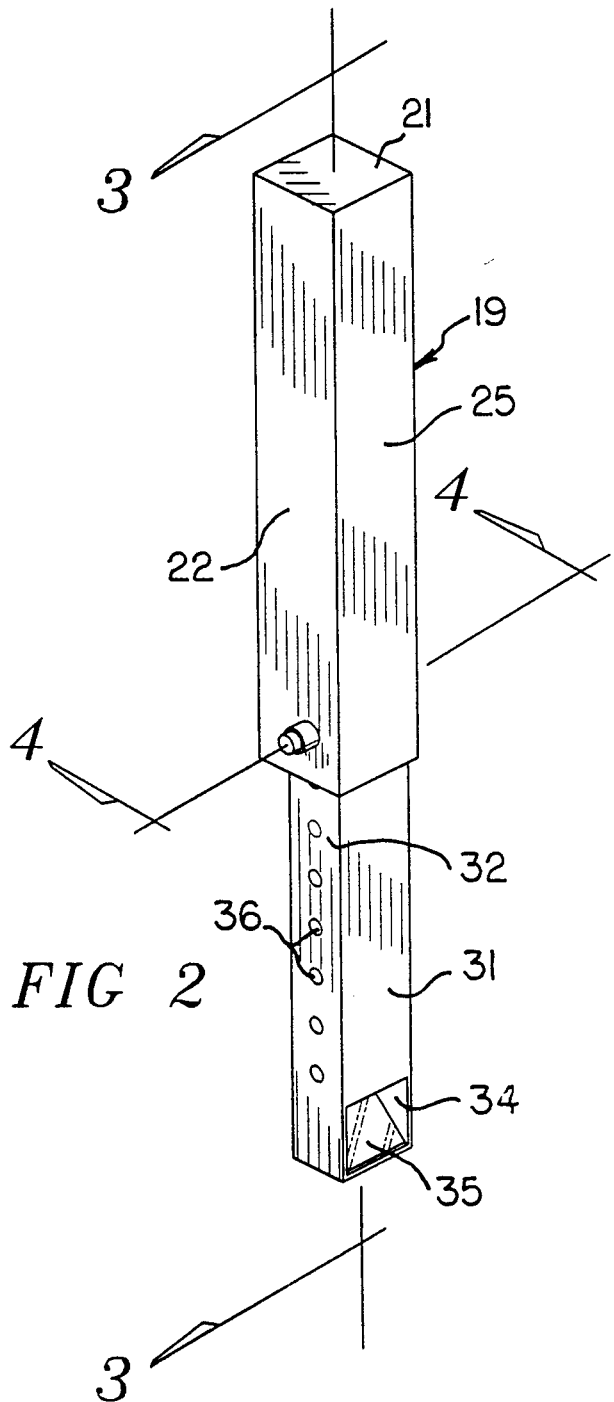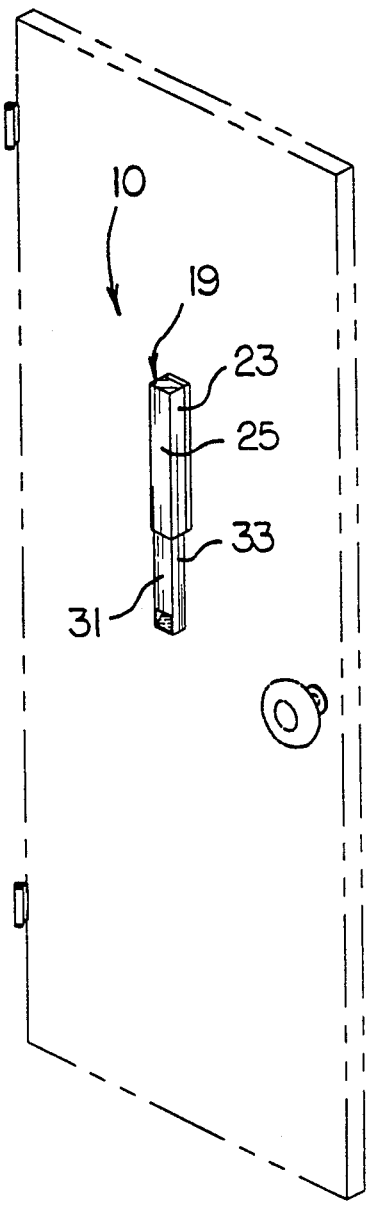

DOOR VIEWING APPARATUS

BACKGROUND OF THE INVENTION

1. Field of the Invention

The field of invention relates to door viewing apparatus, and more particularly pertains to a new and improved door reviewing apparatus wherein the same permits vertical adjustment of viewing through a door peep sight organization.

2. Description of the Prior Art

Door peep sights are typically positioned at a predetermined orientation within a door and such structure per se is exemplified in the U.S. Pat. Nos. 4,892,399; 4,348,083; 4,964,711; and 4,869,021.

The instant invention attempts to overcome deficiencies of the prior art by providing for a door peep sight arranged for employment with the instant invention permitting vertical adjustment of a viewing opening relative to the door peep sight to accommodate individuals of restrictive movement such as individuals confined to wheel chairs and the like and in this respect, the present invention substantially fulfills this need.

SUMMARY OF THE INVENTION

In view of the foregoing disadvantages inherent in the known types of door viewing apparatus now present in the prior art, the present invention provides a door viewing apparatus wherein the same employs a variously adjustable telescope structure mounted to a door member in cooperation with a door peep sight. As such, the general purpose of the present invention, which will be described subsequently in greater detail, is to provide a new and improved door viewing apparatus which has all the advantages of the prior art door viewing apparatus and none of the disadvantages.

To attain this, the present invention provides a periscope structure mounted to a door assembly to accommodate individuals restricted relative to standing, wherein the periscope structure is vertically adjustable and is arranged for ease of mounting to the associated door structure employing a mounting housing organization.

Our invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved door viewing apparatus which has all the advantages of the prior art door viewing apparatus and none of the disadvantages.

It is another object of the present invention to provide a new and improved door viewing apparatus which may be easily and efficiently manufactured and marketed.

It is a further object of the present invention to provide a new and improved door viewing apparatus which is of a durable and reliable construction.

An even further object of the present invention is to provide a new and improved door viewing apparatus which is susceptible of a low cost of manufacture with regard to both materials and labor, and which accordingly is then susceptible of low prices of sale to the consuming public, thereby making such door viewing apparatus economically available to the buying public.

Still yet another object of the present invention is to provide a new and improved door viewing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the invention in use.

FIG. 2 is an isometric illustration of the periscope structure of the invention.

DESCRIPTION OF THE PREFERRED EMBODIMENT

Figure 3:
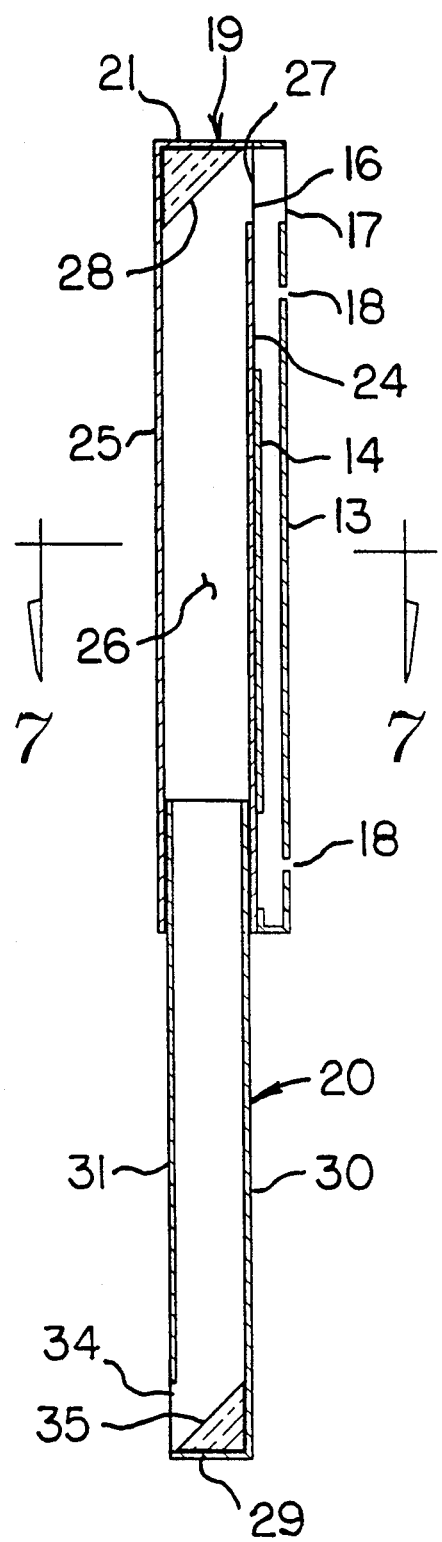
FIG. 3 is an orthographic view, taken along the lines 3—3 of FIG. 2 in the direction indicated by the arrows.
Figure 4:
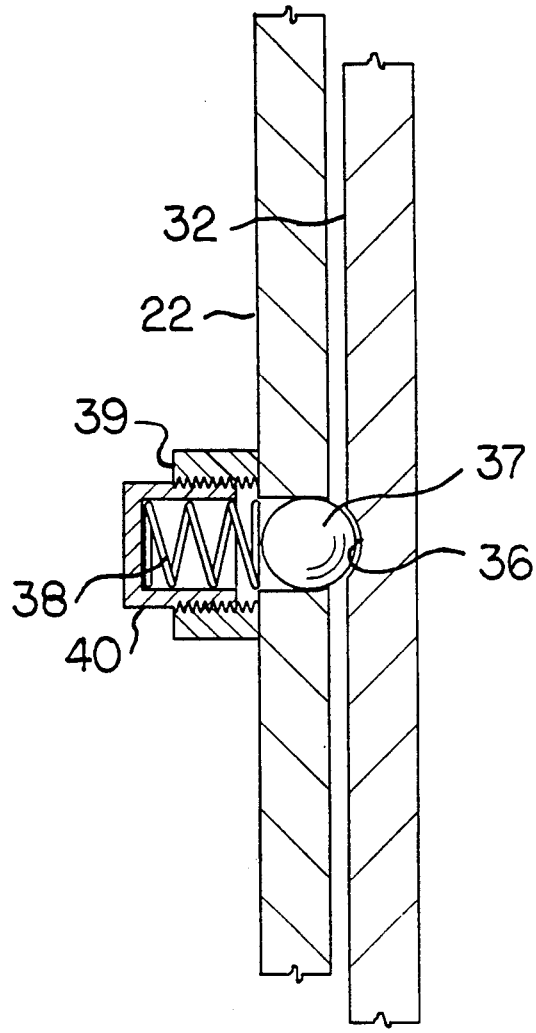
FIG. 4 is an orthographic view, taken along the lines 4—4 of FIG. 2 in the direction indicated by the arrows.

With reference now to the drawings, and in particular to FIGS. 1 to 8 thereof, a new and improved door viewing apparatus embodying the principles and concepts of the present invention and generally designated by the reference numeral 10 will be described.

Figure 5:
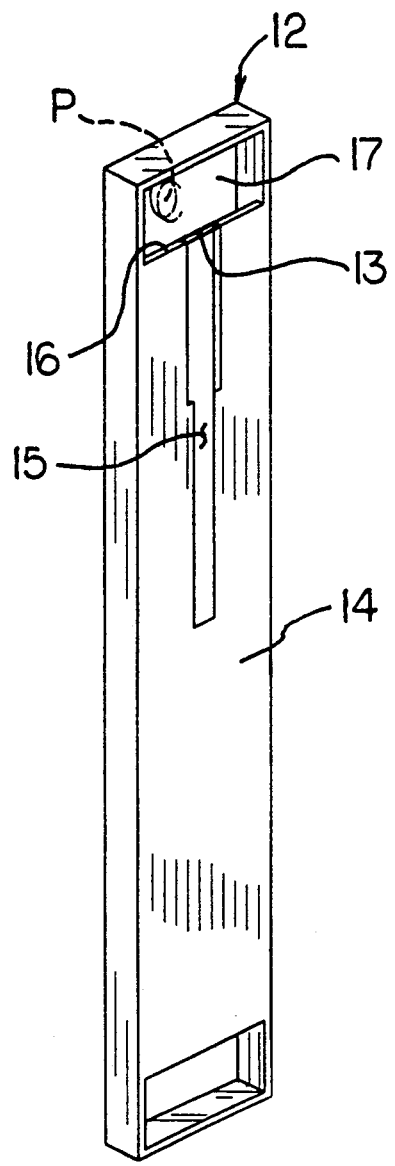
FIG. 5 is an isometric illustration of the mounting housing structure of the invention.

More specifically, the door viewing apparatus 10 of the instant invention essentially comprises the mounting to a door 11 having a door peep sight "P" (see FIG. 5). Mounted to the door 11 is a mounting housing 12, as indicated in FIG. 5, having a mounting housing first wall 13 spaced from a mounting housing second wall 14, with the mounting housing first wall 13 including a first wall opening 17 adjacent a top wall of the mounting housing, with a second wall opening 16 aligned with and coextensive with the first wall opening 17. A second wall slot 15 extends from the second wall opening 16 through the second wall 14 parallel to and medially of the mounting housing side walls. As indicated in FIG. 3, a plurality of fastener openings 18 are directed through the mounting housing first wall 13 to receive fasteners for securement of the mounting housing 12 relative to the door 11.

A periscope structure, such as indicated in FIG. 2, is secured to the mounting housing 12. The periscope structure includes a periscope first housing 19 telescopingly receiving a periscope second housing 20. The first housing includes a first housing top wall 21 having parallel first and second side walls 22 and 23 respectively that are coextensive relative to one another. A first housing rear wall 24 is spaced from and parallel a first housing front wall 25 to define a parallelepiped cavity 26 directed into the first housing 19 from a lowermost end thereof into the first housing. A first housing rear wall 25 to define a opening 27 is directed through the first housing rear wall 24 in adjacency to the first housing top wall 21, with the first housing rear wall opening 27 coextensive with the mounting housing first and second wall openings 17 and 16 respectively, as indicated in FIG. 3. A first mirror 28 is mounted within the first housing cavity 26 and positioned to the top wall 21 and the first housing front wall 25 at their intersection oriented at an acute angle relative to the first housing top wall 21 and the first housing front wall 25. Typically, this angular orientation is forty-five degrees. The second housing 20 includes a second housing bottom wall 29 and a second housing rear wall 30 spaced from a second housing front wall 31, and including second housing first and second side walls 32 and 33. A second housing front wall opening 34 in adjacency to the second housing bottom wall 29 is in horizontal alignment with a second mirror 35 mounted within the second housing to the second housing bottom wall 29 and the second housing rear wall 30 at an acute angle to each of the second housing bottom and rear walls 29 and 30, with such angulation typically equalling forty-five degrees to provide for a periscope organization. The second housing is telescopingly received within the first housing by use of a plurality of recesses defining a row of spaced recesses 36 oriented parallel between the second housing front and rear walls 31 and 30, with the recesses directed into the second housing first side wall 32. A locking sphere 37 (see FIG. 4) projects through the mounting housing 12 in engagement with one of the recesses 36 having a spring 38 abutting the locking sphere 37. An internally threaded boss 39 receives the spring, as well as an externally threaded plug member 40 as the externally threaded plug member 40 is arranged to provide for adjustable pressure onto the locking sphere 37 by use of the spring 38 to insure a non-slip engagement of the locking sphere relative to one of the preselected recesses 36.

Figure 6:
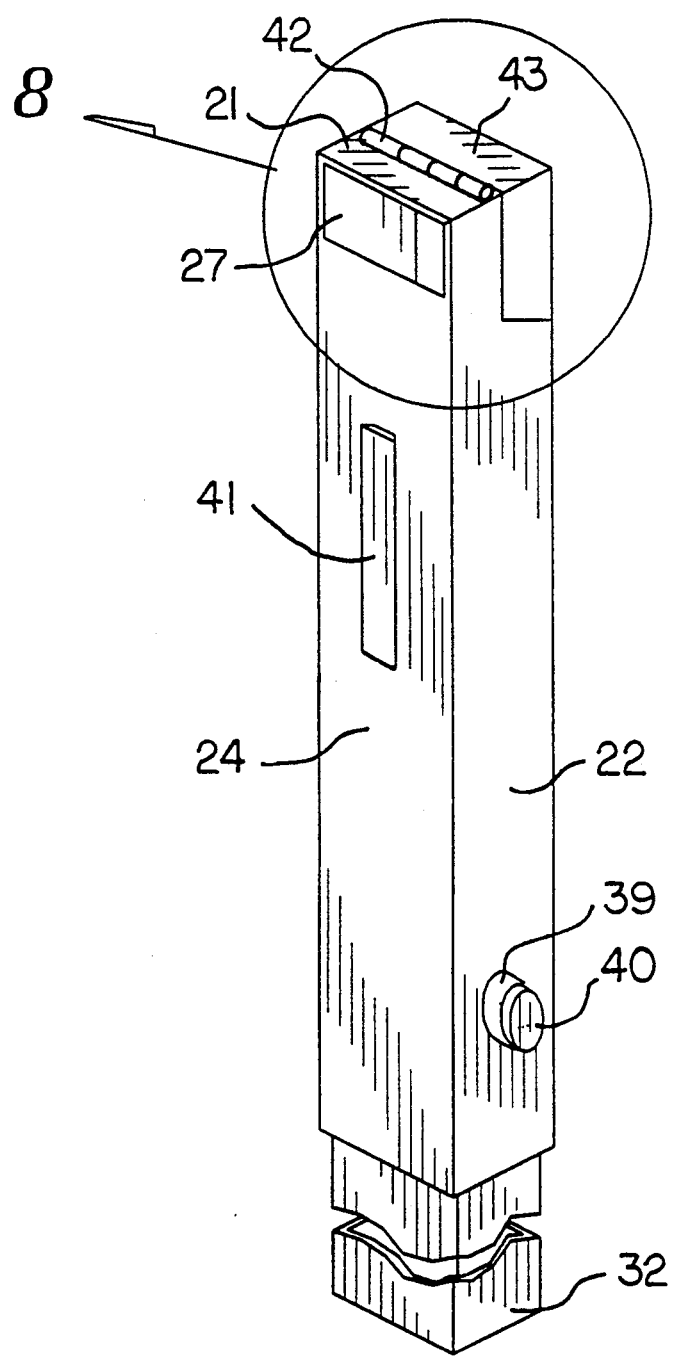
FIG. 6 is an isometric rear view of the periscope structure of the invention.
Figure 7:
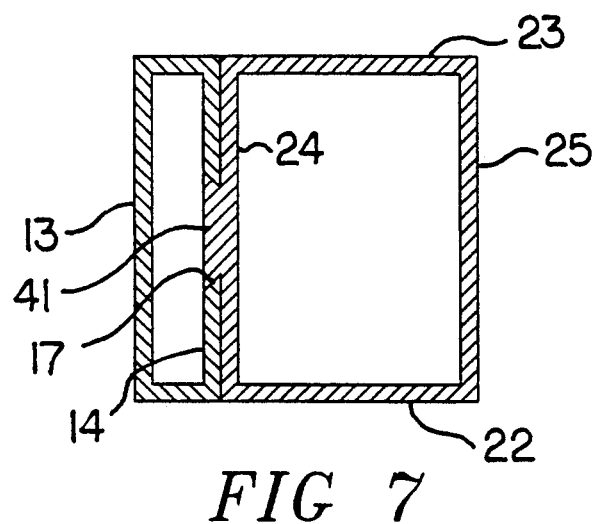
FIG. 7 is an orthographic view, taken along the lines 7—7 of FIG. 3 in the direction indicated by the arrows.

The FIG. 6 and the FIG. 7 indicate the dove tail projection 41 oriented parallel between the first housing first and second side walls 32 and 33 fixedly mounted onto the first housing rear wall 24. The dove tail projection 41 is arranged for reception within the second wall slot 15. As indicated in FIG. 5, the door peep sight "P" is arranged for alignment with the mounting housing first wall openings 17, the mounting housing second wall opening 16, as well as the first housing rear wall opening 27 for alignment with the first mirror 28.

Figure 8:
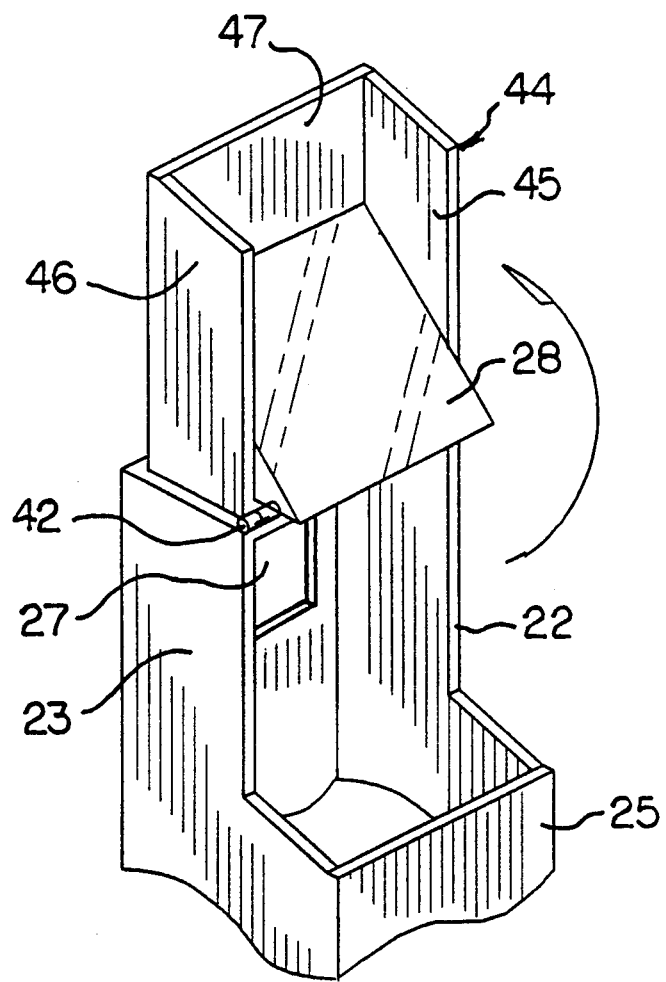
FIG. 8 is an isometric illustration of a modified upper housing by use of the invention.

The FIGS. 6 and 8 indicate the use of a first mirror lid structure having a hinge 42 oriented coextensively of the first housing top wall 21 orthogonally between the first housing first and second side walls 22 and 23. The first mirror lid includes a first mirror 28 mounted within the lid having a front wall segment 47 as a portion of the front wall 25, and respective first and second side wall segments 45 and 46 of the respective first housing first and second side walls 22 and 23. The first mirror lid 44 includes a top wall segment 43 oriented between the hinge 42 and the first housing front wall 25 permitting pivoting of the lid about the hinge 42, in a manner as indicated in FIG. 8, to permit ease of direct viewing of the door peep sight "P" through the first housing rear wall opening 27 and the mounting housing first and second wall openings 17 and 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A door viewing apparatus arranged for mounting to a door, with the door having a peep sight directed therethrough, with the apparatus comprising, a mounting housing, the mounting housing including a mounting housing first wall spaced from a mounting housing second wall, and mounting housing first and second spaced side walls, and including a mounting housing top wall, with a first wall opening directed through the mounting housing first wall in adjacency to the mounting housing top wall, and, a mounting housing second wall opening directed through the mounting housing second wall, with the mounting housing first wall opening aligned with and coextensive the mounting housing second wall opening, and, a second wall slot directed along the mounting housing second wall parallel between the mounting housing side walls extending from the first wall opening, and, a periscope assembly having a first housing and a second housing, with the second housing telescopingly received within the first housing, and the first housing having a first housing first side wall spaced from a first housing second side wall, a first housing rear wall spaced from a first housing front wall, and a first housing top wall, with a first housing parallelepiped cavity directed into the first housing from a lower distal end of the first housing, and the second housing telescopingly received within the first housing cavity, and the first housing rear wall including a dove tail projection slidably received within the second wall slot of the mounting housing, and, the mounting housing rear wall including a rear wall opening coextensive with and aligned relative to the mounting housing first wall opening and the mounting housing second wall opening for viewing of the door peep sight by the periscope assembly.

2. An apparatus as set forth in claim 1 wherein the first housing includes a first mirror mounted within the first housing cavity in adjacency to the first housing rear wall opening, and the second housing including a second housing bottom wall, a second housing rear wall, a second housing front wall, and a second housing first side wall spaced from a second housing second side wall, and a second housing front wall opening directed through the second housing front wall in adjacency to the second housing bottom wall, and a second mirror mounted within the second housing simultaneously to the second housing bottom wall and the second housing rear wall, with the first mirror and the second mirror arranged substantially parallel relative to one another, and lock means mounted to the first housing first side wall for cooperation with the second housing first side wall for adjustably securing the second housing within the first housing.

3. An apparatus as set forth in claim 2 wherein the lock means includes a locking sphere directed through the first housing first side wall, and an internally threaded boss projecting orthogonally and fixedly mounted to the first housing first side wall, and the internally threaded boss including an externally threaded plug member threadedly received within the internally threaded boss, and a spring captured between the externally threaded plug member and the locking sphere to impose the locking sphere onto the second housing first side wall, and the second housing first side wall including a row of spaced recesses, wherein the locking sphere is received within one of said recesses and the row of spaced recesses are oriented parallel between the second housing front wall and the second housing rear wall.

4. An apparatus as set forth in claim 3 wherein the first housing includes a hinge coextensive of the first housing top wall orthogonally oriented relative to the first housing first side wall and the first housing second side wall, and a top wall segment oriented between the hinge along the first housing top wall and the first housing front wall, and the top wall segment integral with a first mirror lid, with the first mirror lid further including a first side wall segment coplanar with the first housing first side wall, and a second side wall segment coplanar with the first housing second side wall, and a front wall segment, with the first mirror fixedly mounted to the front wall segment and the top wall segment to permit pivoting of the first mirror in a displaced orientation relative to the first housing rear wall opening to permit viewing of the door peep sight through the mounting housing first wall opening and the mounting housing second wall opening.

* * * * *